United States Patent [19]

Burnham

[11] Patent Number: 4,487,090
[45] Date of Patent: Dec. 11, 1984

[54] FRICTION DRIVE TRANSMISSION
[75] Inventor: Walter J. Burnham, Pittsburgh, Pa.
[73] Assignee: Westinghouse Electric Corp., Pittsburgh, Pa.
[21] Appl. No.: 412,760
[22] Filed: Aug. 30, 1982
[51] Int. Cl.³ ............................................. F16H 13/08
[52] U.S. Cl. .................................... 74/798; 74/206; 192/45
[58] Field of Search ............... 74/206, 208, 209, 798, 74/199, 200, 201, 202, 785, 788, 796, 64, 690; 192/45, 45.2

[56] References Cited

U.S. PATENT DOCUMENTS

| | | | |
|---|---|---|---|
| 2,444,470 | 7/1948 | Richardson | 74/209 X |
| 2,585,886 | 2/1952 | Whitlow | 74/64 |
| 2,602,339 | 7/1952 | Moen | 74/206 |
| 2,858,706 | 11/1958 | Alexandersson | 74/209 |
| 3,254,546 | 6/1966 | Nasvytis | 74/798 |
| 3,776,051 | 12/1973 | Kraus | 74/208 |
| 3,793,907 | 2/1974 | Nakamura et al. | 74/798 |
| 3,817,125 | 6/1974 | Nakamura et al. | 74/798 |
| 3,848,476 | 11/1974 | Kraus | 74/206 |
| 3,945,270 | 3/1976 | Nelson et al. | 74/798 |
| 3,990,328 | 11/1976 | Galbraith | 74/796 |
| 4,121,331 | 10/1978 | Fukuma et al. | 29/434 |
| 4,157,668 | 6/1979 | Fukuma et al. | 74/798 |
| 4,158,317 | 6/1979 | James | 74/798 X |
| 4,224,840 | 9/1980 | Kraus | 74/798 |
| 4,262,555 | 4/1981 | van der Lely | 74/796 X |
| 4,296,648 | 10/1981 | Okano et al. | 74/798 |

FOREIGN PATENT DOCUMENTS

| | | | |
|---|---|---|---|
| 481891 | 3/1952 | Canada | 74/213 |
| 603224 | 10/1934 | Fed. Rep. of Germany | 74/796 |
| 1650741 | 12/1970 | Fed. Rep. of Germany | 74/798 |
| 1187613 | 9/1959 | France | 74/798 |
| 117878 | 8/1918 | United Kingdom | 74/208 |
| 1056520 | 1/1967 | United Kingdom | 74/798 |

OTHER PUBLICATIONS

Product Engineering, "Friction Drive Features Spring-Loaded Idlers", Jul. 6, 1959, pp. 54–56.

Primary Examiner—Leslie A. Braun
Assistant Examiner—Dwight G. Diehl
Attorney, Agent, or Firm—R. P. Lenart

[57] ABSTRACT

A frictional drive transmission is provided with a plurality of drive rollers disposed within an annular path created between a shaft and a cylindrical inner surface of a case. The drive rollers are pivotally linked to pinions attached to a second shaft. A plurality of pinch rollers are urged between the drive rollers and the cylindrical inner surface of the case, forcing the drive rollers into frictional contact with the pinch rollers and the central shaft. Rotation of the shaft attached to the pinions, causes rotation of the pinch rollers and drive rollers, and therefore rotation of the central shaft.

11 Claims, 2 Drawing Figures

FRICTION DRIVE TRANSMISSION

BACKGROUND OF THE INVENTION

This invention relates to rotary motion transmitting devices and more particularly, to friction drive transmissions which transmit rotational power in a speed changing manner through the use of a plurality of cylindrical rolles arranged in a planetary configuration.

Planetary gear systems are well known in which a plurality of pinions travel around the circumference of a sun gear and engage an internal ring gear. Such systems are compact and have input and output shafts which are axially aligned. In addition, the side pressure of the input and output shafts is equalized. However, the expense of machining planetary gear systems frequently prevents their use.

In order to develop an economical alternative to planetery gear systems, several planetary drive systems utilizing ball bearings or cylindrical rollers have been designed. Such systems have employed various techniques to insure that sufficient frictional contact is maintained between the rolling elements. U.S. Pat. No. 3,793,907, issued Feb. 26, 1974, to Nakamura et al. discloses a frictional drive system which utilizes hydraulic pressure to control the frictional contact between rolling elements. U.S. Pat. No. 3,817,125, issued June 18, 1974, to Nakamura et al. utilizes elastically deformed planetary rollers. U.S. Pat. No. 3,776,051, issued Dec. 4, 1973, to Kraus and U.S. Pat. No. 3,945,270, issued Mar. 23, 1976 to Nelson et al. both utilize drive systems in which the shafts are on axes which are parallel to but slightly spaced from each other. This provides a varying annular space between one shaft and a traction ring attached to a second shaft. A plurality of drive rollers which are disposed between the first shaft and the traction ring are provided with certain degrees of freedom so that they can be wedged between the shaft and the traction ring. The present invention utilizes a pinch roller planetary design which avoids the expense of machined gears while providing for equalized side pressure on axially aligned input and output shafts. In addition, this invention does not require a constant pressure on the rollers to obtain the traction needed to prevent slippage. The necessary pressure is supplied in response to the torque required, utilizing a pinch principle.

A typical pinch roller drive system, such as found on a phonograph turntable, includes a pinch roller which is loosely held against a motor shaft and the rim of a cylinder being driven. A drive force causes the roller to pinch between the motor shaft and the cylinder. This pinching action is a function of the drive pressure. Therefore, the pressure of the drive is directly proportional to the load requirement. When the load is great, the roller pressure is great. When the load is light, there is little pressure on the rollers. This automatic pressure loading results in an efficient, dependable, quiet and long-lasting drive system.

SUMMARY OF THE INVENTION

A friction drive transmission constructed in accordance with the present invention includes: a case having a cylindrical inner surface; a first rotatable shaft extending into one side of the case and forming an annular path between the cylindrical surface and the shaft; a second rotatable shaft axially aligned with the first shaft and extending into a second side of the case; a plurality of drive rollers within the annular path which are capable of making frictional contact with the surface of the first shaft and coupled to said second shaft; and a plurality of pinch rollers within the annular path which are urged into frictional contact with the cylindrical inner surface and the drive rollers. This urging of the pinch rollers forces the drive rollers into frictional contact with the first shaft.

In one form of this invention, the drive rollers are coupled to the second shaft by a plurality of links which are pivotally attached to a plurality of pinions extending from the second shaft. The drive and pinch rollers are arranged within the case such that rotational motion of the rollers causes them to press together. The pressure exerted is proportional to the load on the shaft being driven.

DESCRIPTION OF THE PREFERRED EMBODIMENT

Figure 1:
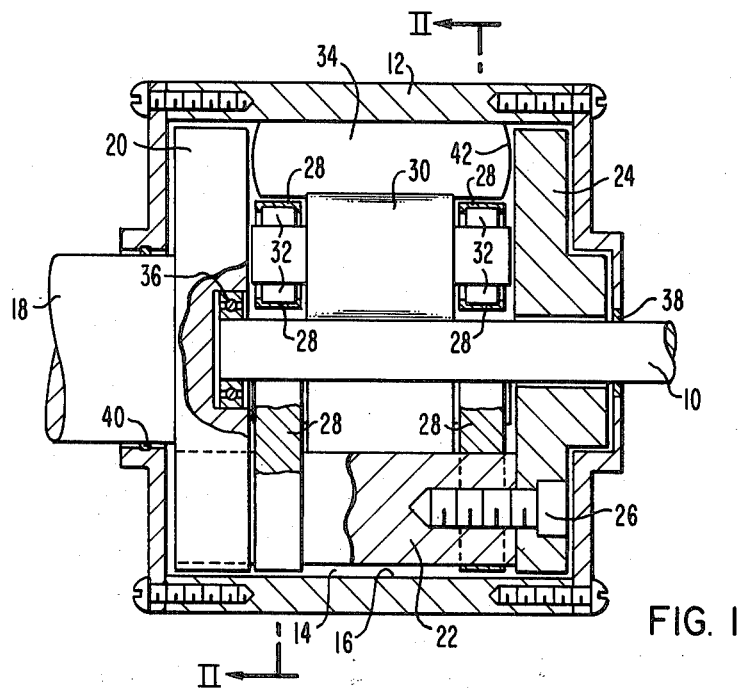
FIG. 1 is a side view of a friction drive transmission constructed in accordance with one embodiment of the present invention.

Referring to the drawings, FIG. 1 is a side view of a friction drive transmission constructed in accordance with one embodiment of the present invention. Shaft 10 extends into one side of case 12, forming an annular path 14 between the surface of shaft 10 and an inner cylindrical surface 16 of case 12. A second shaft 18, which is axially aligned with shaft 10, enters a second side of case 12. In this embodiment, shaft 18 is provided with an enlarged end section 20. A plurality of pinions 22 extend from enlarged section 20 into annular space 14. A bearing boss 24 is connected to the ends of pinions 22 by bolts 26. A plurality of links 28 are pivotally connected at one end to pinions 22 and connected to drive rollers 30 by way of bearings 32 at the other end. Pinch rollers 34 are urged by means not shown in this view into contact with cylindrical inner surface 16 and drive rollers 30. This forces drive rollers 30 into frictional contact with shaft 10. A bearing 36 is provided at the end of shaft 10 to maintain the axial alignment of the end of shaft 10 with shaft 18. In operation, annular path 14 can be filled with clutch oil or fluid which is held within case 12 by oil seals 38 and 40. Pinch rollers 34 are provided with rounded ends 42 to eliminate the possibility of the pinch rollers being jammed between enlarged shaft section 20 and bearing boss 24.

Figure 2:
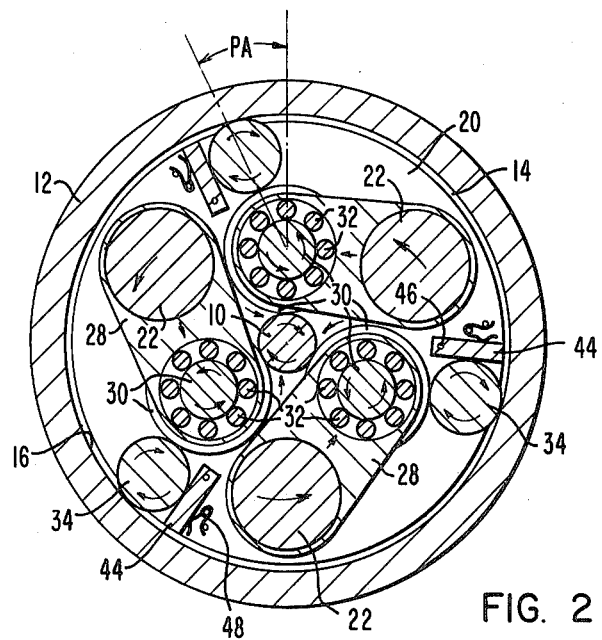
FIG. 2 is a cross-sectional view of the drive system of FIG. 1 taken along line II—II.

FIG. 2 is a cross-sectional view of the friction drive transmission of FIG. 1 taken along line II—II. Arrows have been added to show the direction of rotation of the various elements when shaft 10 is rotated clockwise. Pressure plates 44 which are loosely held in relation to shaft 18 by being pivotally mounted on enlarged segment 20 by pivot pins 46, cooperate with springs 48 to serve as means for urging pinch rollers 34 into frictional contact with inner cylindrical surface 16 and drive rollers 30. Springs 48 serve as means for forcing pressure plates 44 into contact with pinch rollers 34. Therefore, the force exerted by springs 48 also forces drive rollers 30 into frictional contact with shaft 10. Pinions 22 are rigidly attached to enlarged section 20. As enlarged section 20 moves counterclockwise, pinions 22 move links 28 against bearings 32, which in turn move drive rollers 30 around in a counterclockwise direction. As the drive rollers move, they make frictional contact with pinch rollers 34 which are in frictional contact with inner cylindrical surface 16 of case 12, thereby causing drive rollers 30 to turn. Since drive rollers 30 are in frictional contact with shaft 10, this rotation is transmitted to shaft 10.

Pinch angle PA is determined by the diameter of shaft 10, drive rollers 30, pinch rollers 34 and inner cylindrical surface 16. If pinch angle PA is too great, slippage will result. If pinch angle PA is too small, undue pressure is placed on the rollers and the case. It should be apparent that normal roller wear will decrease the pinch angle. When this occurs, any set of rollers can be replaced with rollers of a slightly larger diameter to achieve the proper pinch angle. Changing the rollers will not change the speed ratio, since this ratio is determined by the diameter of shaft 10 and the inside diameter of case 12. The speed ratio of the transmission can be easily changed by changing the diameter of shaft 10 and at least one set of rollers to maintain the proper pinch angle.

Pinch roller frictional drive transmissions in accordance with the present invention can be constructed at a small fraction of the cost of a planetary gear drive for a given size and power requirement. Such transmissions are readily adaptable for use as speed reducers on gear motors since the input and output shafts are axially aligned. Such transmissions are also suitable for wind powered electric generators where the relatively slow speed of the wind turbine shaft must be increased to drive a generator. This invention would allow the turbine shaft and generator to be kept in alignment thereby lowering the cost of the system by limiting the number of shafts and bearings needed.

Since the pinch roller drive system is a frictional drive, it cannot be used where timing is required. In addition, the transmission illustrated in the Figures will automatically disengage when the drive is reversed. This disengaging function can be readily explained by reference to FIG. 2. If enlarged section 20 of the driving shaft is rotated in the clockwise direction, pinions 22 which are attached to section 20 will apply a force on links 28 which pulls drive rollers 30 out of frictional contact with shaft 10 thereby preventing frictional driving of shaft 10.

Disengagement also occurs when the output shaft is turned faster in its normal direction. This characteristic is known as free wheeling and is desirable in certain applications. If shaft 10 of FIG. 2 attempts to turn faster than it is being driven by drive rollers 30, frictional contact will not be maintained between drive rollers 30 and shaft 10, thereby allowing shaft 10 to turn freely. Where a reversible unit is required, another set of pinch rollers 34 and their contact urging parts 44, 46 and 48 of FIG. 2 can be installed back-to-back against the drive rollers 30, thus making the unit reversible.

By symmetrically placing the drive rollers, pinch rollers and pinions within the annular path, side forces on the input and output shafts are equalized. While the preferred embodiment of the invention has been described in detail, it will be apparent to those skilled in the art that various modifications may be made therein without departing from the invention. For example, pressure plates 44 need not be pivotally mounted and may be attached to bearing boss 24 instead of enlarged segment 20. It is therefore intended that the appended claims cover all such changes that fall within the scope of the invention.

What is claimed is:

1. A friction drive transmission comprising:
   a case having a cylindrical inner surface;
   a first rotatable shaft extending into one side of said case forming an annular path between said cylindrical surface and said first shaft;
   a second rotatable shaft axially aligned with said first shaft and extending into a second side of said case;
   a plurality of pinions extending from said second shaft into said annular path, said pinions having axes in parallel with the axes of said first and second shafts;
   a plurality of drive rollers having axes in parallel with the axis of said first and second shafts, said drive rollers being disposed within said annular path, wherein the surface of each drive roller makes frictional contact with the surface of said first rotatable shaft;
   a plurality of links, each of said links being pivotally connected to one of said pinions and to one of said drive rollers;
   a plurality of pinch rollers having axes in parallel with the axis of said first and second shafts, said pinch rollers being disposed within said annular path; and
   means for urging each of said pinch rollers into frictional contact with said cylindrical inner surface and into frictional contact with one of said drive rollers.

2. A friction drive transmission as recited in claim 1, wherein said means for urging each of said pinch rollers comprises:
   a plurality of pressure plates, and means for forcing each of said pressure plates against one of said pinch rollers.

3. A friction drive transmission as recited in claim 2, wherein:
   each of said pressure plates is loosely held in relation to said second shaft; and
   said means for forcing each of said pressure plates includes a plurality of springs, each of said springs exerting a force between a point on said second shaft and one of said pressure plates.

4. A friction drive transmission as recited in claim 1, wherein each of said pinch rollers is rounded at each end.

5. A friction drive transmission as recited in claim 1, further comprising:
   a pinion flange bearing boss, wherein each of said pinions extends between said second shaft and said bearing boss.

6. A friction drive transmission as recited in claim 1, wherein each of said pinions is connected to one of said drive rollers by two of said links.

7. A friction drive transmission as recited in claim 1, wherein all of said drive rollers are of the same diameter.

8. A friction drive transmission as recited in claim 1, wherein all of said pinch rollers are of the same diameter.

9. A friction drive transmission as recited in claim 1, further comprising:
   a first oil seal between said first shaft and said case; and
   a second oil seal between said second shaft and said case, for confining clutch oil within said case.

10. A friction drive transmission as recited in claim 1, wherein said second shaft includes:
    an enlarged portion, said enlarged portion being within said case and said pinions extending from said enlarged portion.

11. A friction drive transmission as recited in claim 1, wherein said pinch rollers are symmetrically disposed within said annular path and wherein said drive rollers are symmetrically disposed within said annular path.

* * * * *